United States Patent [19]

Loziuk et al.

[11] Patent Number: 5,609,328

[45] Date of Patent: Mar. 11, 1997

[54] PIPE RESTRAINT

[75] Inventors: Lawrence A. Loziuk, Vernon Hills, Ill.; Brian C. Bucholtz, Lakeview; Ralph L. Clinard, Jr., Getzille, both of N.Y.

[73] Assignee: Vectra Technologies, Inc., Federal Way, Wash.

[21] Appl. No.: 344,825

[22] Filed: Nov. 23, 1994

Related U.S. Application Data

[63] Continuation-in-part of Ser. No. 274,645, Jul. 13, 1994, Pat. No. 5,441,243.

[51] Int. Cl.$^6$ ............................................. F16F 3/00
[52] U.S. Cl. .............................. 267/136; 267/148
[58] Field of Search ............................. 267/136, 148, 267/149, 154; 248/570, 901, 638, 628, 618, 636, 611, 562, 526, 630, 603; 188/378

[56] References Cited

U.S. PATENT DOCUMENTS

| | | | |
|---|---|---|---|
| 2,421,822 | 6/1947 | Wood | 248/54 |
| 3,025,031 | 3/1962 | Kerley | 267/148 |
| 3,044,759 | 7/1962 | Kerley | 267/148 |
| 3,074,681 | 1/1963 | Kerley | 267/148 |
| 3,204,911 | 9/1965 | Lawrence et al. | 248/358 |
| 3,204,913 | 9/1965 | Lawrence et al. | 267/148 |
| 3,239,207 | 3/1966 | Camossi | 267/1 |
| 3,360,225 | 12/1967 | Camossi | 267/148 |
| 3,371,895 | 3/1968 | Speramza | 267/148 |
| 3,596,865 | 8/1971 | Camossi | 267/148 |
| 4,190,227 | 2/1980 | Belfield et al. | 248/536 |
| 4,397,069 | 8/1983 | Camossi | 29/173 |
| 4,620,688 | 11/1986 | Khlafallah et al. | 248/542 |
| 4,783,038 | 11/1988 | Gilbert et al. | 248/570 |
| 4,835,856 | 6/1989 | Azami . | |
| 4,854,556 | 8/1989 | Pietrzak | 267/148 |
| 4,955,467 | 9/1990 | Kallenbach | 188/381 |
| 5,062,507 | 11/1991 | Roche | 188/378 |
| 5,149,066 | 9/1992 | Smith et al. | 267/136 |
| 5,160,121 | 11/1992 | Bartholomew | 267/136 |
| 5,169,110 | 12/1992 | Smith et al. | 248/570 |
| 5,240,232 | 8/1993 | Loziuk | 267/136 |
| 5,277,394 | 1/1994 | Slemmer . | |

FOREIGN PATENT DOCUMENTS

| | | | |
|---|---|---|---|
| 3302852 | 8/1984 | Germany . | |
| 60-23647 | 6/1985 | Japan . | |
| 1384852 | 3/1988 | U.S.S.R. | 267/148 |
| 1634860 | 3/1991 | U.S.S.R. | 267/148 |

OTHER PUBLICATIONS

New Product Development Report, "Cable Shock and Vibration Isoloator", USS.

"A Wire Rope Seismic Support," Larry A. Loziuk, *Nuclear Engineering and Design 107*, pp. 201–204, Jun. 1, 1987.

Material presented by Larry A. Loziuk at a conference on Aug. 14–18, 1994.

Drawing from U.S. Patent Application Serial No. 07/068,580 or 088,580 (photocopy not legible) entitled Seismic Stop Pipe Support, Robert L. Cloud & Associates, Inc. (no date).

*Primary Examiner*—Mark T. Le
*Attorney, Agent, or Firm*—Christensen, O'Connor, Johnson & Kindness PLLC

[57] ABSTRACT

A pipe restraint (20) permits thermal expansion of a piping system (10), while inhibiting movement of the piping system during dynamic events and providing vibration isolation. The pipe restraint includes first and second displacement members (22) and (24), which are interconnected by a restraining mechanism (32) for restraining displacement of the first and second displacement members relative to one another. The restraining mechanism includes first and second portions, which generally oppose one another relative to the central axis of the restraining mechanism. The restraining mechanism further includes third and fourth portions, which also generally oppose one another relative to the central axis of the restraining mechanism. The third and fourth members are offset circumferentially about the central axis from the first and second members. The first and second portions are connected to one of the displacement members, while the third and fourth portions are connected to the other displacement member. The first, second, third, and fourth portions of the restraining mechanism are interconnected by a helical coil of energy absorbing wire rope.

17 Claims, 8 Drawing Sheets

PIPE RESTRAINT

CROSS-REFERENCE TO RELATED APPLICATION

This application is a continuation-in-part application of prior application Ser. No. 08/274,645, filed Jul. 13, 1994, now U.S. Pat. No. 5,441,243, issued Aug. 15, 1995, the benefit of the priority of which is hereby claimed under 35 U.S.C. §120.

FIELD OF THE INVENTION

The present invention relates generally to restraints to secure an object relative to another object, and more particularly to restraints used with pipes.

BACKGROUND OF THE INVENTION

Piping systems are typically anchored to, or supported by building structures such as walls, floors, or ceilings, at one or more locations. The systems are also anchored to building structures to inhibit movement of the piping system during a dynamic event, such as an earthquake or fluid flow through the pipe. Pipe movement may also be due to the phenomenon known as "water hammer" or objects impacting the piping system.

Piping systems are also subject to temperature changes, which cause thermal expansion, and thus displacement of the piping system. Prior restraints designed for normal support and/or dynamic events may be too restrictive of pipe movement during thermal expansion, and thus result in an over-stressed condition in the piping system or imposition of unacceptable loads on the piping or associated equipment.

Piping systems are also subject to low frequency vibration caused, for example, by rotating equipment associated with the systems, turbulent fluid flow through the systems, or chatter in valves forming part of the system. Pipe restraints designed to react to dynamic loads and thermal expansion do not provide damping for vibration loads.

One attempted solution to these problems has been the use of snubbers. Snubbers allow the piping to freely expand but momentarily restrain the piping system during a dynamic event. However, snubbers have been found to be complex, require maintenance, and have a history of failure, which has resulted in costly inspection programs, especially in the nuclear industry.

Another attempted solution has been the use of gapped supports. Gapped supports allow the piping system to move freely within a predefined area, but rigidly prevent movement of the piping system beyond the boundaries of this area. The problem with gapped supports, though, is that high impact loads are typically imposed upon the piping system and other structures when the piping system reaches a boundary of the predefined area during a dynamic event.

Other attempted solutions have been the use of energy absorbers. For example, U.S. Pat. No. 4,620,688 discloses the use of steel plates, which plastically deform to absorb energy. The problem with the steel plate solution is low cycle fatigue life, requiring frequent replacement of the devices. Another solution is that disclosed in U.S. Pat. No. 4,955,467, in which energy is absorbed by friction. However, a major drawback with this solution is the large amount of variability in the resulting friction force.

In yet another solution, shown in U.S. Pat. No. 5,240,232, loops of wire rope are attached to first and second slide members, which allows movement of the piping system while absorbing energy. This solution, though, has been found to be complex, requiring slide members, and centering bushings, and further subjects the device to undesirable bending loads.

In a prior copending application, a solution is disclosed in which first and second displacement members connect to opposing portions of a helical coil composed of wire rope. One of the displacement members is connected to a piping system, and the other displacement member is connected to a supporting structure. The coil then flexes as displacement loads are applied, for example, by thermal expansion of the piping system, where inhibiting relatively large movements of the piping system caused by dynamic events. However, if the displacement members displace too far relative to one another, the coil tends to collapse, which limits their utility. Collapse of the coil can be prevented by employing movement-limiting stops, but at the cost of increased complexity and weight. The present invention provides an improved wire rope restraint that resists collapse when a severe displacement load is applied.

SUMMARY OF THE INVENTION

The invention provides a pipe restraint for permitting thermal expansion of a piping system, while inhibiting movement of the piping system during dynamic events and providing vibration isolation. The pipe restraint includes first and second displacement members, interconnected by a restraining mechanism for restraining displacement of the first and second displacement members relative to one another. The restraining mechanism includes first and second portions that generally oppose one another relative to the central axis of the restraining mechanism. The restraining mechanism further includes third and fourth portions that also generally oppose one another relative to the central axis of the restraining mechanism. The first and second portions connect to one of the displacement members, while the third and fourth portions connect to the other displacement member.

The first and second portions lie generally in a first plane, while the third and fourth portions lie generally in a second plane that is generally transverse to the first plane. More particularly, the first and second portions are substantially 180 degrees apart from one another, as are the third and fourth portions, measured relative to the central axis of the restraining mechanism. Further, the first portion is positioned approximately midway between the third and fourth portions, again measured relative to the central axis of the restraining mechanism.

In further aspects of the invention, the first and second displacement members each define a channel, wherein the channel of each displacement member slidably inter-engages the other channel. Preferably, the first and second displacement members each define a stop, such that the stop of each displacement member engages one another when the displacement members have moved a predefined maximum distance relative to one another, to prevent further movement of the displacement members. In a preferred embodiment, the channels each terminate in a stop, wherein the stop of each channel abuts one another when the displacement members have moved a predefined maximum distance relative to each other, thereby preventing further relative displacement.

In yet other aspects of the invention, the restraining mechanism includes at least one helical coil, and the first and second displacement members each include a plate, wherein the plates are oriented generally transverse to one another. The helical coil, which preferably comprises wire rope, winds around, and is connected to both plates.

In additional aspects of the invention, the helical coil includes first and second portions. The first portion of the helical coil is wound at a first pitch, while the second portion of the coil is wound at a second pitch. Preferably, the second pitch is substantially identical to the first pitch, except for the direction of the pitch.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENTS

Figure 1:
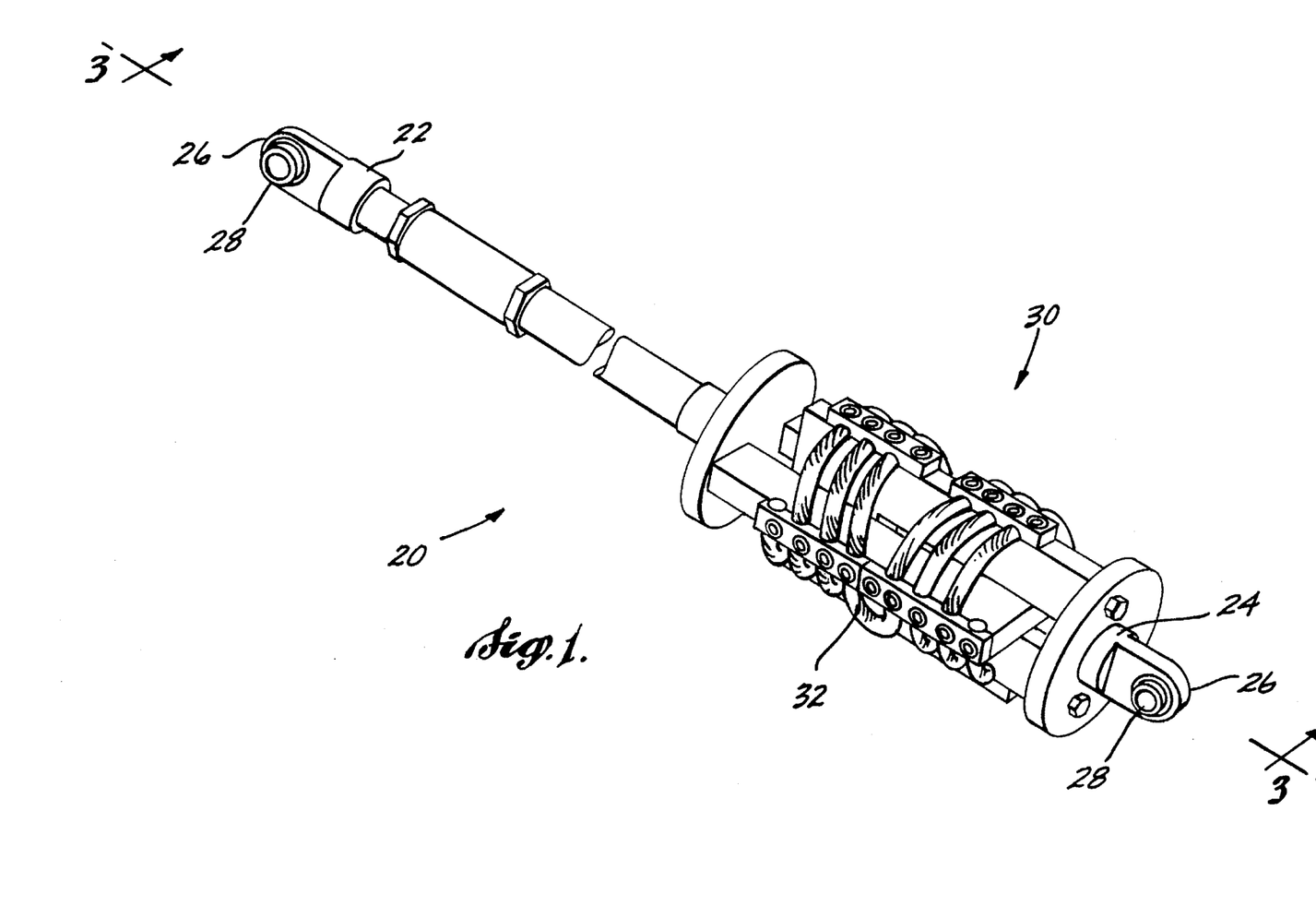
FIG. 1 is an isometric view of a pipe restraint made in accordance with the present invention.

Referring to FIG. 1, a preferred embodiment of a pipe restraint 20 formed in accordance with the present invention is illustrated. Rod ends 22 and 24 project centrally from opposite ends of pipe restraint 20, generally along the longitudinal axis of the pipe restraint. The distal end of each rod end 22 and 24 terminates in annular ring 26 having a spherical connecting bearing 28 mounted therein. When pipe restraint 20 is in use, one of the rod ends 22 or 24 will be connected to a piping system, while the other rod end will be connected to a supporting structure, such as a beam, wall, or floor. When the piping system attempts to move relative to the supporting structure, the rod ends 22 and 24 displace relative to one another to allow for thermal expansion of the piping system, but substantially inhibit relatively large movements of the piping system during a dynamic event. The spherical bearing 28 in each rod end 22 and 24 allows for lateral movement of the piping system relative to the pipe restraint 20.

Pipe restraint 20 includes a coil section 30. The coil section 30 includes a helical coil 32 disposed about the longitudinal axis of the coil section 30. The coil 32 inhibits longitudinal displacement of the rod ends 22 and 24 relative to one another. Preferably, helical coil 32 is formed of conventional wire rope. The use of wire rope helps to damp dynamic movements of the piping system. When wire rope is used, the strands composing the rope rub together as the rod ends 22 and 24 move relative to one another, dissipating energy. This energy dissipation causes damping, and is an important feature of the invention. When the rod ends 22 and 24 move relative to one another, the coil 32 provides the restraining, or energy absorbing mechanism to resist longitudinal movement of the rod ends relative to one another. A source of wire rope that has been found acceptable for practicing the present invention is provided by Loose & Company of Promfret, Conn. As explained in more detail below, the particular choice of wire rope, or other material to form a coil 32, depends upon the requirements of the particular piping system, facility, and equipment interconnected.

Figure 2:
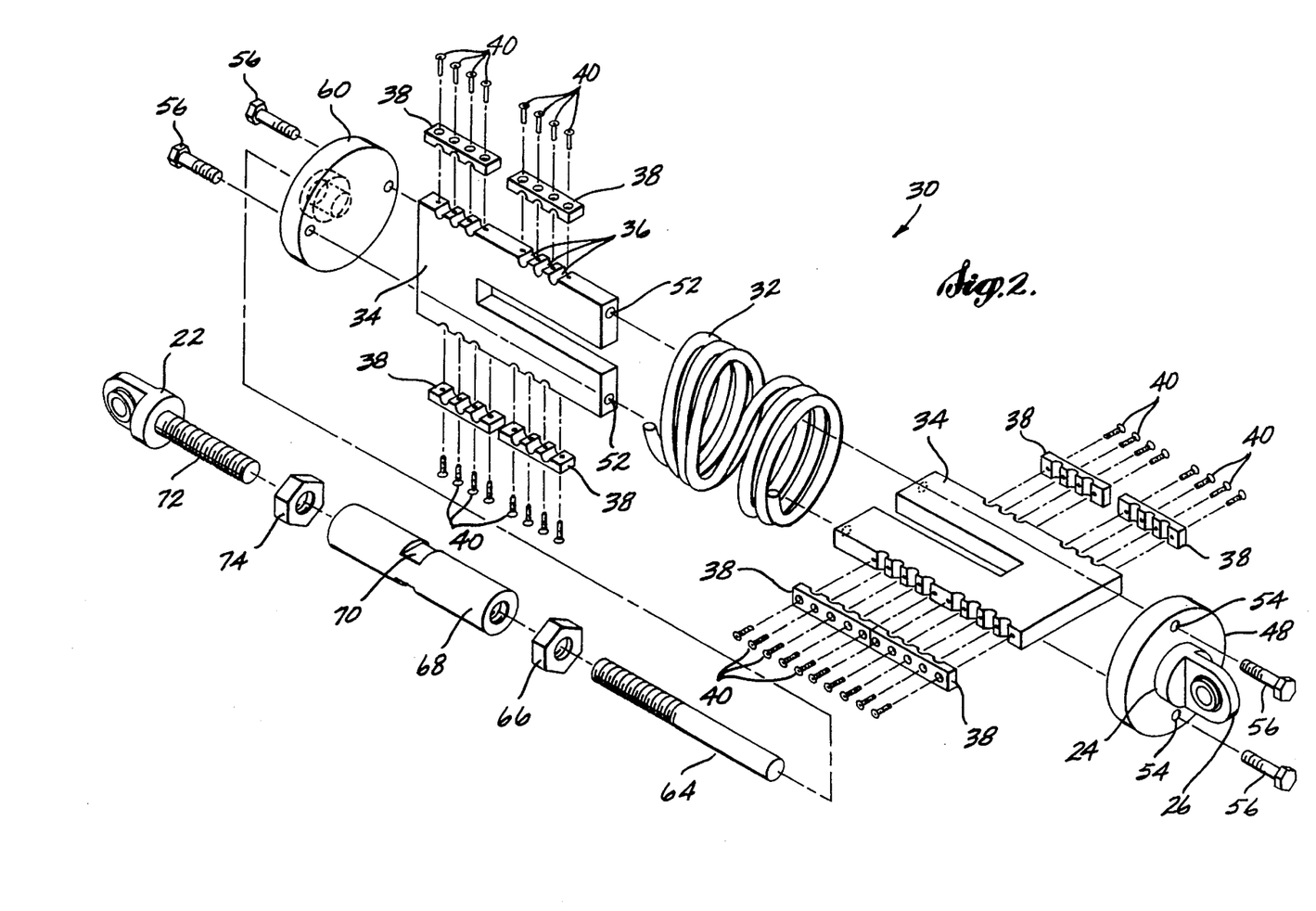
FIG. 2 is a partially exploded isometric view of the pipe restraint of FIG. 1.

Referring to FIG. 2, an exploded view of the pipe restraint 20 of FIG. 1, the coil section 30 includes a pair of U-shaped plates 34 that are each formed generally in the shape of a "U". The plates 34 inter-engage one another so that the parallel fingers of each plate, which define the sides of the U-shape, mesh together in a finger joint. The plates 34 are oriented such that the plane of each plate is generally transverse to the other plate, with the central axis of the plates substantially aligned with one another. The fingers of each plate 34 mesh together in an overlapping but noncontact relationship, such that the plates can displace longitudinally relative to one another along the axis of the channels of the U-shape plates.

The coil 32 wraps helically around the inter-engaged plates 34, with the channel of the U-shape of each plate generally located along the central axis of the coil. As will be described later, depending on the load to be restrained and the space available, the coil 32 can be wrapped around the plates 34 with a variety of different pitches, or a varying pitch. Further, more than one coil can be employed. There are also a variety of techniques and configurations for the attachment points of a coil, or coils, to inter-engaged plates in accordance with the present invention. These features allow for a great deal of flexibility in the design requirements that can be met. For example, a particular piping system may require a pipe restraint that exhibits particular force-displacement characteristics. This requirement may possibly be met by adjusting the pitch of a coil that is used in a pipe restraint in accordance with the present invention. Alternatively, coils can be added or removed from the pipe restraint, or other adjustments can be made as required by a particular application.

Returning to FIG. 2, portions of the coil 32 are received in a plurality of half-cylindrical channels 36, formed at spaced locations in opposite edges of each plate 34. Clamping plates 38, having a corresponding number of half-cylindrical channels 37 at intervals generally corresponding to the intervals of half-cylindrical channels 36, attach to each edge of U-shaped plates 34 that have half-cylindrical channels 36 formed therein.

The half-cylindrical channels 36 and 37 are formed as follows. Bore holes having a diameter approximately equal to the wire rope 32 are first formed near the longitudinal, outside edges of a U-shaped plate. A saw is then used to cut away the outside segment of each U-shaped plate along a line passing generally through the center of each bore hole.

The portion cut away forms clamping plate 38. The opposing portion forms the outside edge of the U-shaped plate 34. The saw used to cut clamping plate 38 away from U-shaped plate 34 removes a finite portion of each plate as small particles. Hence, when clamping plates 38 are attached to U-shaped plates 34, the portions of the coil 32 received in the half-cylindrical channels 36 and 37 are damped snugly therebetween because the opposing edges of the clamping plate 38 and U-shaped plate 34 are separated by the space that was occupied by the particles removed by the saw cut.

Each set of half-cylindrical channels 36 formed in a first edge of a U-shaped plate 34 of coil section 30, must be offset relative to the set of half-cylindrical channels 36 formed in a second, opposite edge of a U-shaped plate 34 of the same coil section 30. The reason for the offset is to account for the pitch of the helical coil 32. The central axis of the half-cylindrical channels 36 may be formed generally transverse to the side of the U-shaped plate 34, or at an angle thereto to approximate the pitch of the helical coil 32. Since the coil 32 is preferably made of wire rope, which is flexible, the central axis of each half-cylindrical channel 36 is generally transverse the surface of the U-shaped plate 34 for ease of manufacturing.

Clamping plates 38 may be attached to U-shaped plates 34 by any conventional method secure enough to substantially prevent the portions of the coil 32 clamped in the half-cylindrical channels 36 and 37 from displacing. One such method is welding, but the preferred method is using counter sunk screws 40 that extend through the damping plate into the U-shaped plate 34. Counter sinking the screws reduces projections that may inadvertently catch on other objects, and decreases the maximum diameter of pipe restraint 20 so that the pipe restraint can be located in confined areas where space is at a minimum.

Rod end 24 projects generally centrally from one face of a circular endcap 48. The opposite face of circular endcap 48 attaches approximately perpendicularly to the edge of one of the U-shaped plates 34. More particularly, circular endcap 48 attaches to the edge of U-shaped plate 34 opposite to opening of the channel formed therein. Endcap 48 has a diameter approximately equal to the width of U-shaped plate 34, and attaches to U-shaped plate 34 such that the central axis of the endcap 48 approximately aligns with the longitudinal axis of the pipe restraint 20.

Endcap 48 may be attached to U-shaped plate 34 by any method known in the art, such as welding, but the preferred method is to form threaded bore holes 52 in U-shaped plate 34. Bore holes 54, corresponding in location and spacing to bore holes 52 are formed in circular endcap 48. Threaded bolts 56 pass through bore holes 54 in circular endcap 48, and thread into bore holes 52 formed in U-shaped plate 34. Bolts 56 are tightened to snugly hold endcap 48 against U-shaped plate 34.

A circular endcap 60 attaches to the other U-shaped plate 34 in the same manner as endcap 48. Specifically, threaded bolts 56 pass through bore holes 54 in endcap 60, and thread into the end of U-shaped plate 34. The bolts 56 thread into the end of U-shaped plate 34 having the channel from the U-shape formed therein.

Figure 3:
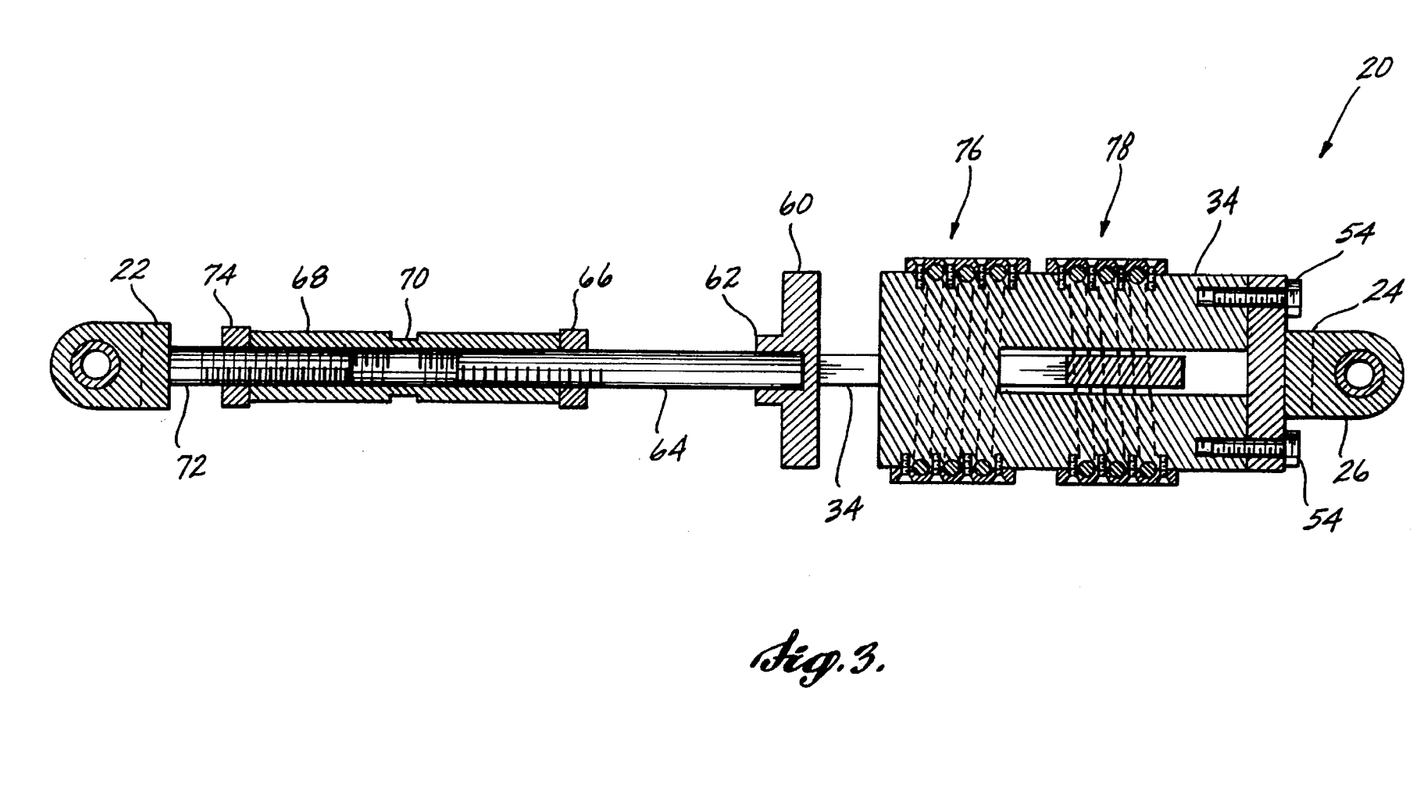
FIG. 3 is a partial longitudinal cross-sectional view of the pipe restraint of FIG. 1 taken along section line 3–3 of FIG. 1.

Referring now to FIG. 3, a cylindrical nose portion 62 projects centrally from the opposite side of endcap 60 that attaches to U-shaped plate 34. One end of a rod 64 is inserted into nose portion 62, and preferably welded therein. In other embodiments, rod 64 may be threaded into nose portion 62.

The end of rod 64 opposite nose portion 62 is threaded. Nut 66 is threaded onto this end of rod 64. One end of a generally cylindrical sleeve 68, having internal threads, is threaded onto rod 64, following nut 66. When sleeve 68 has been threaded onto rod 64 to a desired depth, nut 66 is tightened against sleeve 68 to snugly secure sleeve 68 in place. To facilitate tightening sleeve 68 against nut 66, sleeve 68 includes a flattened region 70 to receive a wrench for preventing sleeve 68 from turning while nut 66 is being tightened.

Rod end 22 includes a centrally projecting rod 72 having external threads formed on the distal end of rod 72. The distal end of rod 72 threads through a nut 74, and then into the end of sleeve 68 that is opposite endcap 60. When rod 72 has been threaded into sleeve 68 to a desired depth, nut 74 is tightened against sleeve 68 to securely hold rod 72 in place. As described above, flattened portion 70 of sleeve 68 facilitates the use of a wrench on sleeve 68, when tightening nut 74 against sleeve 68.

Rods 64 and 72, and sleeve 68 are sized according to the particular length required for a pipe restraint 20. In some situations, the piping system will be located a significant distance away from a supporting structure, requiting that these items be longer so that pipe restraint 20 extends from the piping system to the supporting structure. In other situations, the piping system will be located near a supporting structure, so that these items can be shorter. Moreover, a rod and sleeve assembly could be provided for the other endcap 48. Alternatively, a variety of endcaps could be provided having rod ends projecting therefrom of different lengths, so that an endcap having a rod end of a particular length could be selected for a particular application.

It will be readily appreciated by those skilled in the art that sleeve 68, along with rods 64 and 72, and nuts 74 and 66 function as a turnbuckle. The turnbuckle feature allows for fine adjustments of the length of pipe restraint 20. Additionally, the turnbuckle feature allows for preloading. That is, some load can be applied to pipe restraint 20 by using the turnbuckle feature, without waiting for a piping system to thermally expand, or otherwise move relative to a supporting structure.

Pipe restraint 20 permits the piping system to thermally expand or contract because inter-engaged U-shaped plates 34 in each coil section 30 may slidably displace relative to one another along the channel of each U-shaped plate. Coil 32 flexes, but resists displacement in an elastic mode, such that unacceptable levels of stress are not imposed upon the piping system, nor upon the components the piping system interconnects. When the displacement force is removed, the coil returns to its original configuration.

During a dynamic event, such as an earthquake, or other piping system movement caused by water hammer or inadvertent impact with the piping system, pipe restraint 20 permits the piping system to move only relative to one another. During this movement, the coil 32 resists movement of the piping system, and attenuates impact forces. Further, the strands in the wire rope, which the coil 32 preferably comprises, rub together to dissipate energy, and provide a damping effect.

A feature of pipe restraint 20 is that coil 32 is captured by a U-shaped plate 34 and clamping plates 38 attached thereto, at opposing locations relative to the central axis of the coil, wherein the opposing locations define a first plane. The other U-shaped plate 34 of the coil section 30 captures the coil 32 at opposing locations, wherein these define a second plane. The planes defined by the sets of first and second opposing locations are generally transverse to one another. The wire rope is thus captured by the U-shaped plates every quarter loop, i.e., approximately every 90° around each coil. Thus, when the sets of capture locations displace relative to each other, there is substantially no tendency for coil 32 to collapse. This results in a less complex structure, and substantially eliminates bending forces that would otherwise be imposed upon the pipe restraint 20 so that the pipe restraint can be made lighter.

As noted previously, the coil 32 provides the restraining, or energy absorbing mechanism, to resist movement of the U-shaped plates 34 relative to one another. Other structures in accordance with the present invention may be used to perform this function of the coil 32. For example, one or more circular loops (not shown) could be used in place of, or along with a coil. Each loop would encircle the inter-engaged plates 34, wherein the central axis of each loop would generally coincide with the central axis of the inter-engaged plates. One U-shaped plate 34 would capture substantially opposing first and second portions of each loop, while the other U-shaped plate 34 would capture substantially opposing third and fourth portions of the loop, wherein the first and second portions define a line that is generally transverse to a line defined by the third and fourth portions. Therefore, when the sets of capture locations displace relative to each other, there would be substantially no tendency for a loop to collapse. Thus, this would provide the advantages described above in connection with a coil 32.

Another feature of pipe restraint 20 is that the helical coil 32 is wound onto U-shaped plates 34 with a first pitch 76, and a second pitch 78 as indicated in FIG. 3. The second pitch 78 corresponds to the first pitch 76, except that the second pitch is in the reverse direction. This feature serves to prevent the coil 32 from causing the U-shaped plates 34 from twisting as the plates displace relative to one another.

Figure 4:
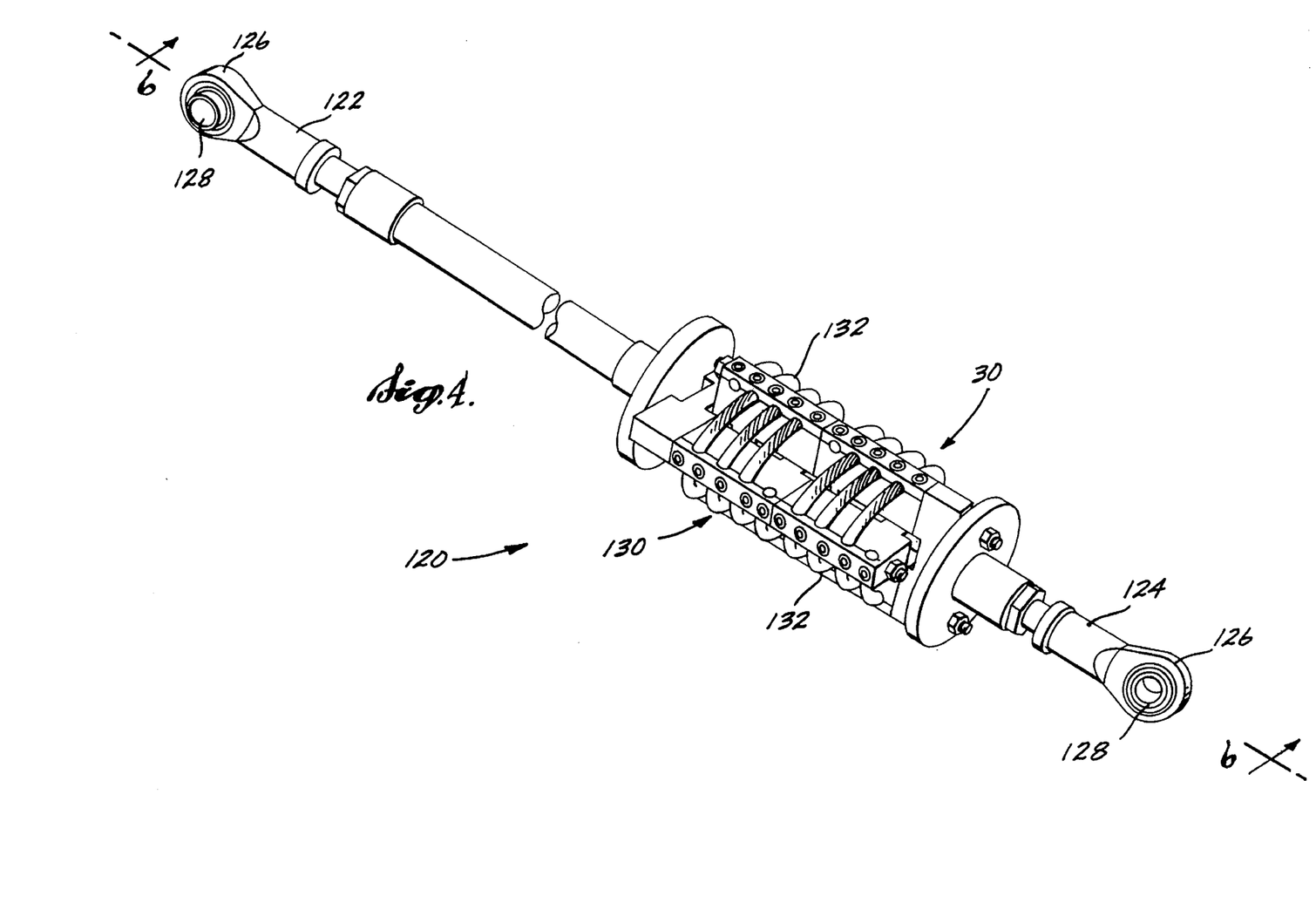
FIG. 4 is an isometric view of an alternative embodiment of a pipe restraint made in accordance with the principles of the present invention.

Referring to FIG. 4, an alternative preferred embodiment of a pipe restraint 120 formed in accordance with the present invention is illustrated. Rod ends 122 and 124 project centrally from opposite ends of pipe restraint 120, generally along the longitudinal axis of the pipe restraint 120. The distal end of each rod end 122 and 124 terminates in an annular ring 126 having a spherical bearing 128 mounted therein as in the previously described embodiment.

Each pipe restraint 120 includes one or more coil sections 130. Each coil section 130 includes at least one helical coil 132 disposed about the longitudinal axis of the coil section 130, the coil 132 being for inhibiting longitudinal displacement of the rod ends 122 and 124 relative to one another. Preferably, helical coil 132 is formed of conventional wire rope as previously described with another embodiment.

Figure 5:
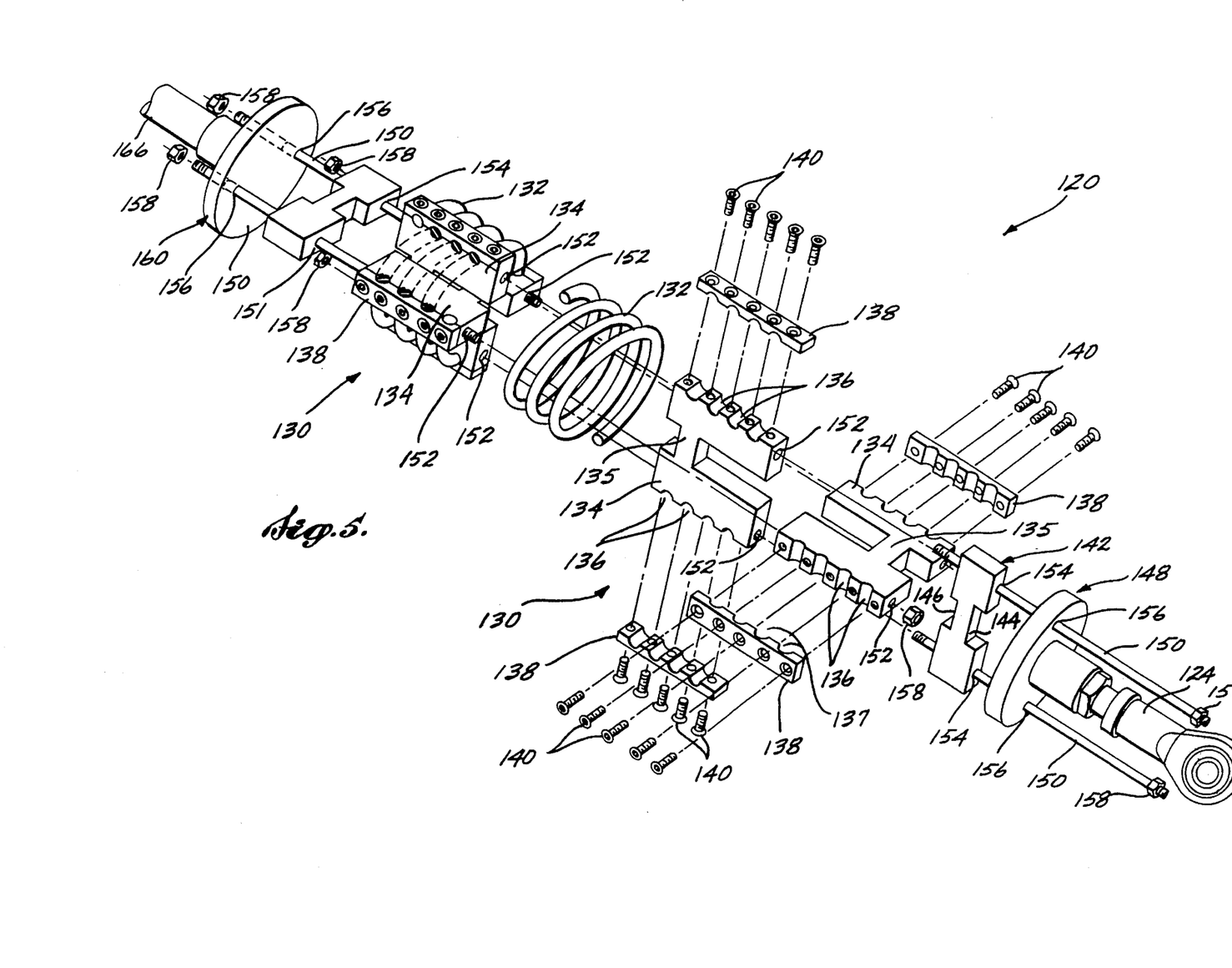
FIG. 5 is a partially exploded isometric view of the pipe restraint of FIG. 4.

FIG. 5 illustrates a partially exploded view of the pipe restraint 120 of FIG. 4. As shown, each coil section 130 includes a pair of I-shaped plates 134. Plates 134 each generally have an I-shape, with a web section 135 substantially offset to one side of the I-shape, such that a deep channel is formed in one side of the plate, relative to a shallower channel formed in the opposite side of the plate. The plates 134 inter-engage one another so that the "fingers" of each plate, which define the deep channel, mesh together as in a finger joint. However, unlike a typical finger joint, the plates 134 are oriented such that the plane of each plate is generally transverse to the other plate, with the central axis of the plates substantially aligned with one another. The "fingers" of each plate 134 mesh together in a sliding fit, such that the plates can displace relative to one another along the deep channel of each plate.

The coil 132 helically wraps around the inter-engaged plates 134, with the deep channel of each plate generally located at the central axis of the coil. Portions of the coil 132 are received in a plurality of half-cylindrical channels 136, formed at generally regularly spaced apart locations in opposite edges of each plate 134. A clamping plate 138, having a corresponding number of half-cylindrical channels 137, at intervals generally corresponding to the intervals of channels 136, attaches to each edge of I-shaped plates 134 that have half-cylindrical channels 136 formed therein. The half-cylindrical channels 136 and 137 are formed in the same way that the half-cylindrical channels 36 and 37, described in connection with pipe restraint 20 are formed. Thus, half-cylindrical channels 136 and 137 also hold portions of coil 132 in the same way that half-cylindrical channels 36 and 37 hold portions of coil 32.

Each set of half-cylindrical channels 136 formed in a first edge of an I-shaped plate 134 of coil section 130 are offset relative to the set of half-cylindrical channels 136 formed in a second, opposite edge of an I-shaped plate 134 of the same coil section 130 to account for the pitch of the helical coil 132. The central axis of the half-cylindrical channels 136 may be formed generally transverse to the side of the I-shaped plate, or at an angle thereto to approximate the pitch of the helical coil 130. Since the coil 130 is preferably made of wire rope, which is flexible, the central axis of each half-cylindrical channel 136 is generally transverse to the surface of the I-shaped plate 134 for ease of manufacturing.

Clamping plates 138 may be attached to I-shaped plates 134 by any conventional method secure enough to substantially prevent the portions of the coil 132 clamped in the half-cylindrical channels 136 and 137 from displacing. One such method is welding, but the preferred method is using counter-sunk screws 140. Counter-sinking the screws reduces projections that may inadvertently catch on other objects, and decreases the maximum diameter of pipe restraint 120 so that the pipe restraint may be located in confined areas where space is at a minimum.

Transition plate 142, having a height and thickness substantially the same as that of I-shaped plates 134, is positioned between a coil section 130 and rod end 124. An edge of one of the I-shaped plates 134 of adjacent coil section 130 substantially evenly abuts, and attaches to, an edge of transition plate 142. The remaining I-shaped plate 134 of the coil section 130 is positioned between transition plate 142 and I-shaped plate 134.

Transition plate 142 includes a first rectangular channel 144 centrally formed opposite the coil section 130. Transition plate 142 includes a smaller rectangular channel 146, having a width less than the width of the first channel 144, centrally formed adjacent the coil section 130. Smaller channel 146 has a width substantially equal to the width of the channels formed in the I-shaped plates 134. Thus, channel 146 substantially aligns with the deeper channel of abutting I-shaped plate 134, such that the web section 135 of the remaining I-shaped plate 134 is movably engaged therebetween.

A circular endcap 148 attaches to the edge of transition plate 142, opposite coil section 130. Endcap 148 has a diameter approximately equal to the height of transition plate 142, and attaches to transition plate 142 such that the central axis of the endcap 148 generally aligns with the longitudinal axis of the pipe restraint 120. As described below in more detail, rod end 124 mounts to endcap 148.

In the preferred embodiment shown in FIGS. 4 and 5, a second coil section 130 abuts the first coil section, with the longitudinal axis of both sections generally aligning with one another. Coil sections 130, transition plate 142 and endcap 148 are all attached together. Any conventional method of attachment may be used that is sufficient to withstand the forces pipe restraint 120 is subjected to, such as welding, bolts, screws, etc. Preferably the method of attachment is with rods 150 having a length sufficient to penetrate the coil sections 130, transition plate 142 and endcap 148. For this purpose, a bore hole 152, having a central axis generally parallel to the longitudinal axis of each I-shaped plate 134, is formed centrally through each finger, or flange portion of I-shaped plate 134. Corresponding bore holes 154 and 156, which substantially align with bore holes 152, are respectively formed in transition plate 142 and endcap 148.

Rods 150 pass through the bore holes 152, 154 and 156 such that one end of each rod extends through the coil section 130 nearest rod end 122, and the opposite end of each rod extends through endcap 150. The projecting ends of each rod 150 are threaded, and capped with nuts 158, the nuts 158 being tightened down to snugly hold the assembly together.

A second transition plate 142 is positioned between coil section 130 and rod end 122. This second transition plate 142 is oriented such that its longitudinal axis is substantially at a 90 degree angle relative to the longitudinal axis of the first transition plate, but otherwise attaches to the coil section 130 nearest rod end 122 in the same way that the coil section 130 and transition plate 142 nearest rod end 122 attach to one another.

A circular endcap 160 attaches to the opposite side of the second transition plate 142. As explained in more detail below, rod end 122 attaches to endcap 160, opposite the second transition plate 142. Endcap 160 has a diameter substantially equal to the diameter of opposite endcap 148, and attaches to the second transition plate 142 in the same way that endcap 148 attaches to the first transition plate.

The two coil sections 130, endcap 160, and the second transition plate 142, are all attached together, in the same way that the two coil sections 130, endcap 148, and the first transition plate 142 are attached together. Specifically, a pair of opposing bore holes 156 are formed in endcap 160, which align with corresponding bore holes 154 in transition plate 142. Bore holes 156 and 154 in mm align with corresponding bore holes 152 formed through one of the I-shaped plates 134 in each of the coil sections 130. A rod 150 penetrates through each set of these bore holes, such that one end of each rod 150 projects through the coil section 130 nearest rod end 124, with the opposite end of the rod projecting beyond endcap 160. The ends of the rods 150 are threaded, and capped with nuts 158. Nuts 158 are tightened down to securely hold the assembly together.

Figure 6:
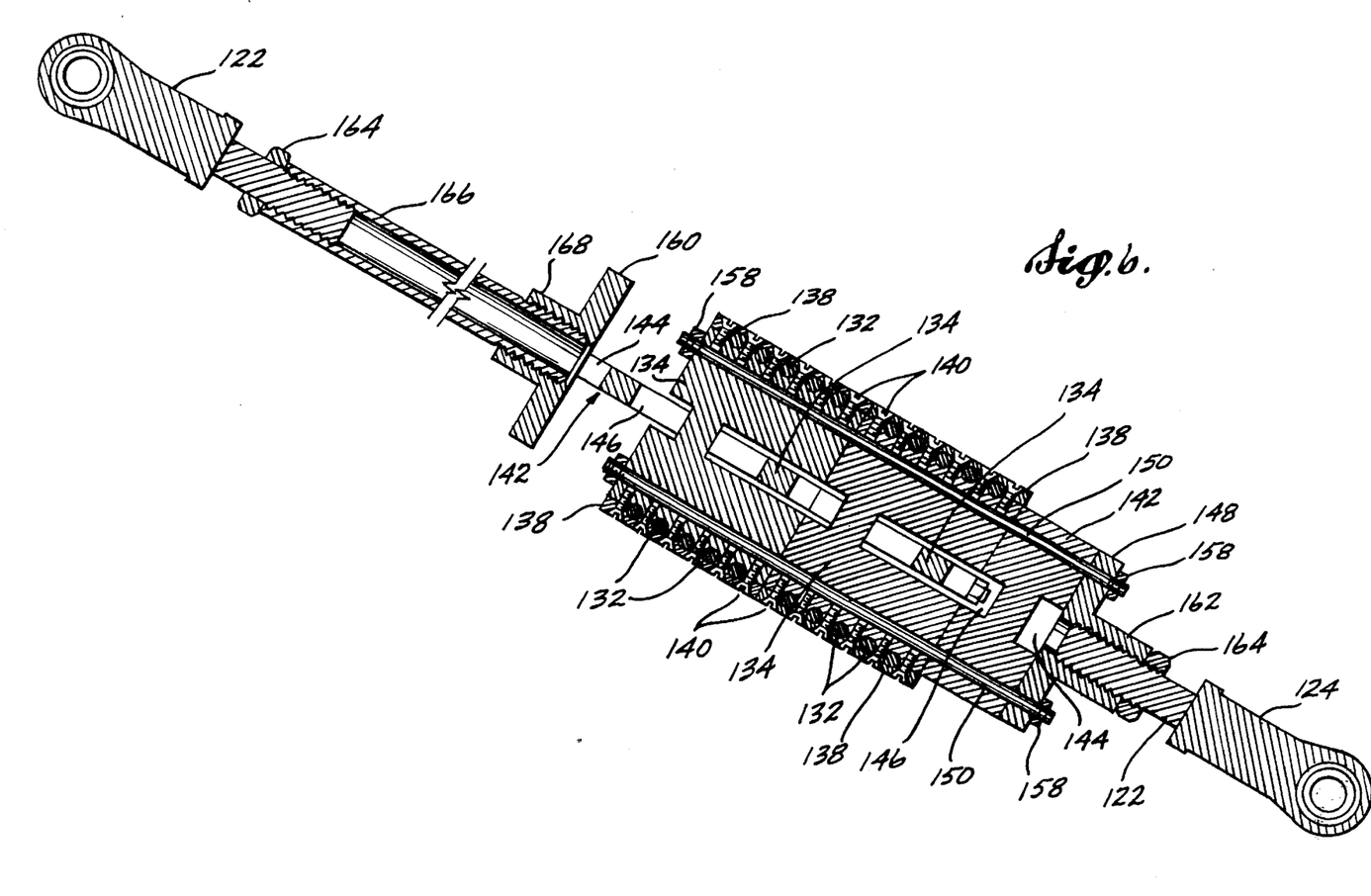
FIG. 6 is a longitudinal cross-sectional view of the pipe restraint of FIG. 4 taken along section line 6–6 of FIG. 4.

Endcap 148 includes a cylindrical nose portion 162, identified in the longitudinal, cross-sectional view of pipe restraint 120 in FIG. 6, which projects centrally away from pipe restraint 120. A bore hole is formed through nose portion 162, generally along the longitudinal axis of pipe restraint 120, with internal threads formed therein. The proximal end of rod end 124 includes corresponding external threads. Thus, rod end 124 is threaded into nose portion 162 to a desired depth. A nut 164 is threaded onto rod end 124 between nose portion 162 and the distal end of rod end 124. When rod end 124 is threaded into nose portion 162 to a desired depth, nut 164 is tightened down against the nose portion 162 to snugly secure the rod end 124. Hence, nose portion 162, rod end 124 and nut 164 act as a turnbuckle.

Hollow, cylindrical extension 166 connects to opposite endcap 160. Specifically, endcap 160 defines centrally projecting nose portion 168 that extends away from pipe restraint 120. A bore hole having internal threads is formed centrally through nose portion 168, into which the proximal end of extension 166 is threaded. The distal end of the hollow cylindrical extension is internally threaded, and the proximal end of rod end 122 includes corresponding external threads. Hence, the proximal end of rod end 122 is threaded into the distal end of extension 166 to a desired depth. A nut 164 is threaded onto rod end 122 between extension 166 and the distal end of rod end 122. When rod end 122 is threaded into extension 166 to a desired depth, nut 164 is tightened down against extension 166 to snugly secure rod end 122. Hence, extension 166, rod end 122 and nut 164 act as a turnbuckle.

Extension 166 is sized according to the particular length required for a pipe restraint 120. In some situations, the piping system will be located a significant distance away from a supporting structure, requiting a longer extension 166 so that pipe restraint 120 extends from the piping system to the supporting structure. In other situations, the piping system will be located near a supporting structure, requiring a relatively shorter extension 166, or no extension 166 at all. In other embodiments, rod end 122 is inserted in extension 166 and welded into place, and only rod end 124 is used as a turnbuckle. Moreover, an extension 166 could be easily provided for the other endcap 148. Alternatively, extension 166 could be eliminated, and rod ends 122 or 124 could be provided having different lengths.

The turnbuckle feature of rod ends 122 and 124 allows for fine adjustments of the length of pipe restraint 120. Additionally, the turnbuckle feature, allows for preloading. That is, some load can be applied to pipe restraint 120 by using the turnbuckle feature, without waiting for a piping system to thermally expand, or otherwise move relative to a supporting structure.

Pipe restraint 120 permits the piping system to thermally expand or contract because inter-engaged I-shaped plates 134 in each coil section 130 may slidably displace relative to one another along the deeper channel of each I-shaped plate. Coil 132 flexes, but resists displacement in an elastic mode, such that unacceptable levels of stress are not imposed upon the piping system, nor upon the components the piping system interconnects. When the displacing force is removed, the coil returns to its original configuration.

During a dynamic event, such as an earthquake, or other piping system movement caused by water hammer or inadvertent impact with the piping system, pipe restraint 120 permits the piping system to move only until a web section 135 of one of the I-shaped plates 134 contacts the web section of another I-shaped plate or the web section of a transition plate 142. During this movement, the coil 132 resists movement of the piping system, and attenuates impact forces. Further, the strands in the wire rope, which the coil 132 preferably comprises, rub together to dissipate energy, and provide a damping effect.

Each coil 132 is captured by an I-shaped plate 134 and clamping plates 138 attached thereto, at opposing locations relative to the central axis of the coil wherein the opposing locations define a first plane. The other I-shaped plate 134 of the coil section 130 captures the coil 132 at opposing locations, wherein these locations define a second plane. Planes defined by the sets of first and second opposing locations are generally transverse to one another. Thus, when the sets of capture locations displace relative to each other, there is substantially no tendency for the coil 132 to collapse. This results in a less complex structure, and substantially eliminates bending forces that would otherwise be imposed upon the pipe restraint 120 so that the pipe restraint can be made lighter.

As described previously in connection with another preferred embodiment, structures other than a coil may be employed to provide a restraining, or energy absorbing mechanism. For example, one or more loops (not shown) encircling the inter-engaged I-shaped plates 134 may be employed as described earlier.

Figures 8, 9:
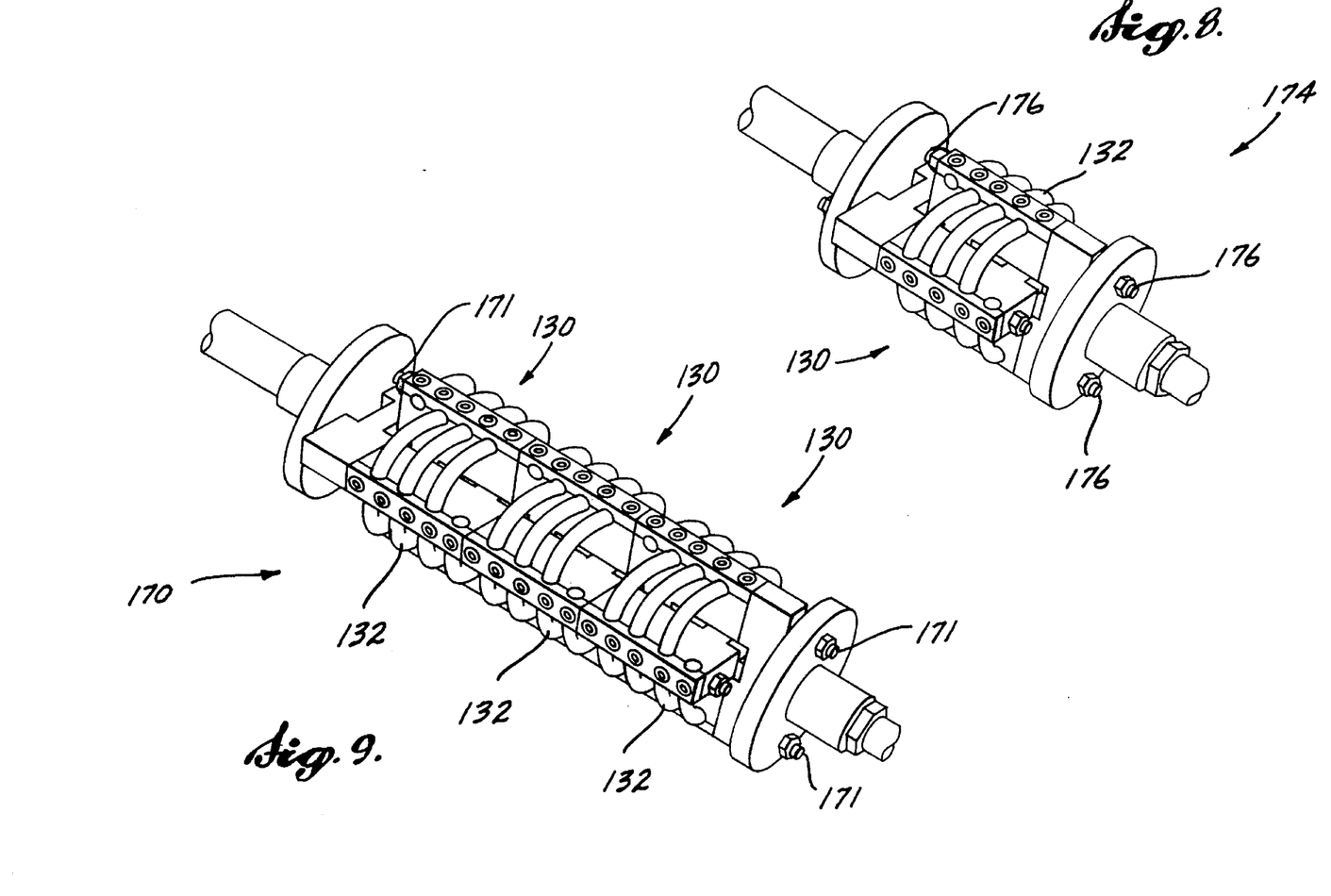
FIG. 8 is an isometric view of a pipe restraint made in accordance with the present invention, having a single coil section.
FIG. 9 is an isometric view of a pipe restraint made in accordance with the present invention, having three coil sections.

Coil sections 130 can be easily added or removed. For example, FIG. 9 is a sketch of a pipe restraint 170 formed in accordance with the present invention having three coil sections 130. The number of coil sections 130 to be used is generally based upon the requirements of the piping system and the facility with which the piping system is being used. If it is important that the piping system be rigidly held in place, a plurality of coil sections 130 can be used. As more coil sections 130 are used, more resistance to movement of the piping system is provided. If more than two coil sections 130 are used in a pipe restraint, longer rods 171 are used because it is necessary to pass through several coil sections 130, but otherwise all of the other components are substantially identical as previously described.

If the piping system is delicate, and/or equipment interconnected by the piping system is sensitive to stress, a single coil section 130 can be used, as in pipe restraint 174 shown in FIG. 8. The reason for using a single coil section 130 is because in that situation there is only one helical coil 132 to resist displacement of the piping system. Hence, the pipe restraint 174 is more elastic, or flexible. If a single coil section 130 is used, shorter rods 176 are used because it is only necessary to pass through a single coil section 130, but otherwise all of the other components are substantially identical as previously described.

Preferably, a pipe restraint in accordance with the present invention, only includes a single coil section 130 as shown in FIGURES. However, in some situations, where a pipe restraint is required to carry a greater load capacity, coil sections can be stacked as shown in FIGS. 4–6, and 9.

Figure 7A:
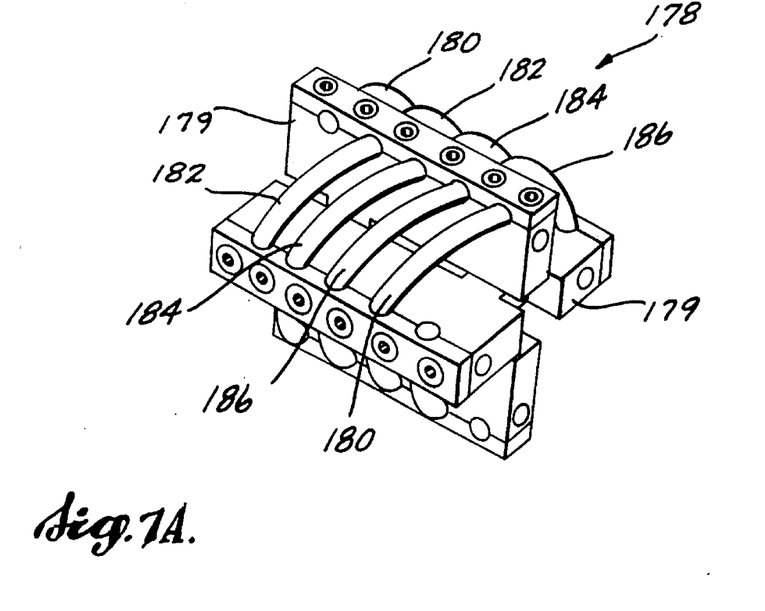
FIG. 7A is an isometric view of a coil section from the pipe restraint of FIGS. 4–6, having more than one coil.
Figure 7B:
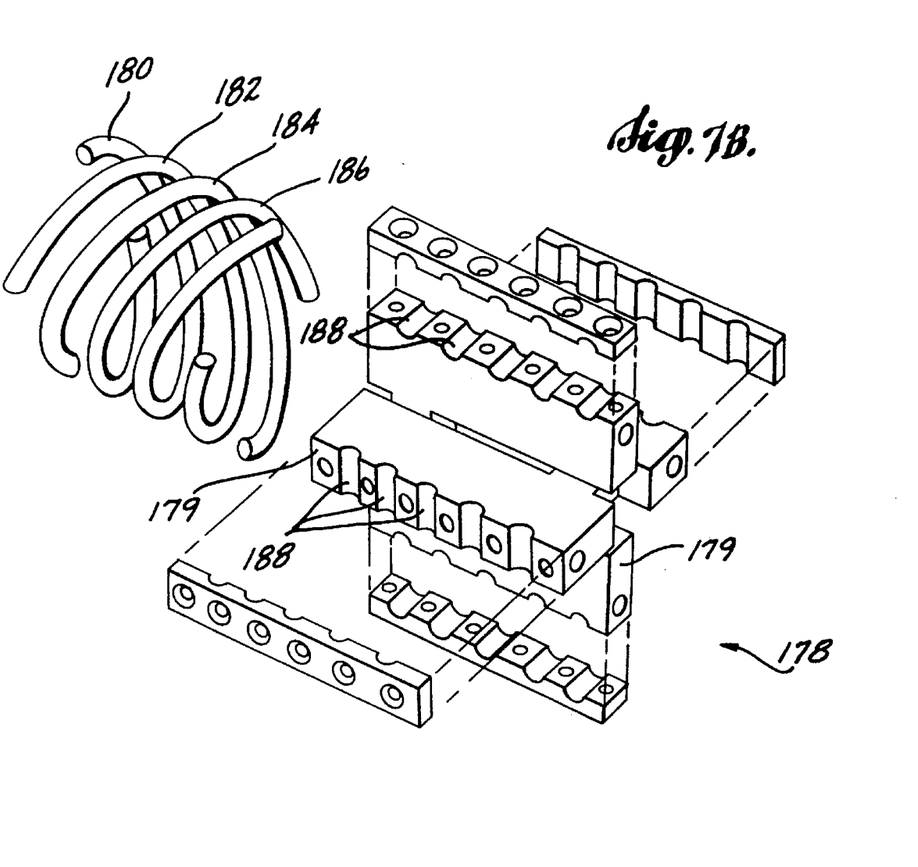
FIG. 7B is a partially exploded isometric view of the coil section of FIG. 7A.

Another feature of the present invention, is that a single coil section can include more than one coil. For example, referring to FIGS. 7A and 7B, a coil section 178 incorporates four coils 180, 182, 184 and 186, each wound around, and clamped in place to a pair of inter-engaged I-shaped plates 179. FIG. 7A is an assembled view of coil section 178, while FIG. 7B is a partially exploded view of coil section 178, showing the coils 180, 182, 184 and 186 exploded away from the inter-engaged I-shaped plates 179. Coil section 179 is used in the same way as previously described coil sections 130, and may replace coil sections 130.

I-shaped plates 179 are substantially identical to I-shaped plates 134 as previously described, with one principal exception. Namely, I-shaped plates 179 include five half-cylindrical channels 188 formed in opposite edges of each plate 179, while I-shaped plates 134 preferably only include four half-cylindrical channels 136. Otherwise I-shaped plates 179 are substantially identical to I-shaped plates 134, with the I-shaped plates of both embodiments inter-engaging in the same manner.

As each coil 180, 182, 184 and 186 winds around inter-engaged plates 179, each coil advances one half-cylindrical channel 188 for every 90 degrees traveled relative to the longitudinal axis of the coil section 178. For example, coil 180 begins in the left-most half-cylindrical channel 188 of the vertically-oriented I-shaped plate 179 as viewed in FIGS. 7A and 7B. Coil 180 then advances 90 degrees to the second, left-most half-cylindrical channel 188, on the back-side of the horizontally oriented plate 179. Subsequently, coil 180 advances to the third, left-most half-cylindrical channel 188 90 degrees later, on the lower edge of the vertically oriented plate 179, and so on. Coil 180 continues in this manner, until it terminates in the right-most half-cylindrical channel 188 in the upper edge of the vertically-oriented plate 179.

Each coil 180, 182, 184 and 186 is wound around I-shaped plates 179 such that adjacent coils are 90 degrees out of phase with one another. For example, coil 180 begins in the upper, left-most half-cylindrical channel 188 of the vertically-oriented plate 179. Adjacent coil 182 also begins in the left-most half-cylindrical channel 188, but 90 degrees later, on the front side of horizontally-oriented plate 179. Coil 184, which is adjacent to coil 182, begins 90 degrees later in the left-most half-cylindrical channel 188 on the lower edge of the vertically-oriented plate 179. Finally, coil 186 begins 90 degrees after coil 184, in the left-most half-cylindrical channel 188, on the back side of horizontally oriented plate 179.

Coil sections having more than one coil have been found advantageous when it is desirable to provide a pipe restraint having a more linear force-displacement characteristic. That is, the force required to displace the rod ends 122 and 124 relative to one another varies more linearly relative to the mount of displacement.

Preferably, the components comprising pipe restraints made in accordance with the present invention are constructed of steel, which provides good structural strength. Stainless steel is used to provide good corrosion resistance, in addition to good structural strength.

The choice of wire rope to be used for a coil in pipe restraints made in accordance with the present invention, is based upon the requirements of the piping system and the facility the piping system is being used. If the piping system is delicate, and/or equipment interconnected by the piping system are sensitive to stress, a more elastic wire rope is chosen, e.g., a wire rope of smaller diameter or wire rope formed of a more elastic material. However, if it is important that the piping system be nearly rigidly held in place, a less elastic wire rope can be used, e.g., a large diameter wire rope or wire rope formed of a less elastic material.

While the preferred embodiment of the invention has been illustrated and described, it will be appreciated that various changes can be made therein without departing from the spirit and scope of the invention. For example, in alternate embodiments, a coil section having two coils, rather than a single coil as in coil section 130, or four coils as in coil section 178, could be used. In another example, telescoping concentric cylinders could replace the inter-engaging I-shaped plates in a coil section. A coil would be disposed around the inner cylinder, with first opposing portions of the coil attached to the outer surface of the inner cylinder. Second opposing portions of the coil, transverse to the first opposing portions, would be attached to the inner surface of the outer cylinder. Thus, the coil would resist displacement of the cylinders relative to one another. It is therefore intended that the scope of letters patent granted hereon be limited only by the definition contained in the appended claims, and equivalents thereof.

The embodiments of the invention in which an exclusive property or privilege is claimed are defined as follows:

1. A pipe restraint for permitting thermal expansion of a piping system, while inhibiting movement of the piping system in a single direction during dynamic events and providing vibration isolation, the pipe restraint comprising:

(a) a first displacement member;

(b) a second displacement member; and (c) restraining means for restraining displacement of the first and second displacement members relative to one another, the restraining means including:

(i) first and second portions, the first and second portions generally positioned on opposing sides of the central axis of the restraining means; and (ii) third and fourth portions generally positioned on opposing sides of the central axis of the restraining means, wherein the first and second portions are connected to one of the displacement members, and the third and fourth portions are connected to the other displacement member, said restraining means comprising first and second helical coils wound around said displacement members, said first coil being axially displaced from said second coil, said first coil being wound in a direction opposite to said second coil.

2. The pipe restraint of claim 1, wherein the first portion and second portion are approximately 180 degrees apart from one another, relative to the central axis of the restraining means.

3. The pipe restraint of claim 1, wherein the third portion and fourth portion are approximately 180 degrees apart from one another, relative to the central axis of the restraining means.

4. The pipe restraint of claim 1, wherein the first portion is located between the third and fourth portions relative to the central axis of the restraining means.

5. The pipe restraint of claim 1, wherein the third and fourth portions are each approximately 90 degrees apart from the first portion relative to the central axis of the restraining means.

6. The pipe restraint of claim 1, wherein the first and second portions, lie generally along a first plane, and the third and fourth portions lie generally along a second plane, wherein the first plane is generally transverse to the second plane.

7. The pipe restraint of claim 1, wherein the first displacement member defines a first channel, and the second displacement member defines a second channel, the first and second channels movably inter-engaging one another.

8. The pipe restraint of claim 7, wherein the first channel terminates in a first stop, and the second channel terminates in a second stop, the first and second stops abutting one another when the first and second displacement members have displaced a predefined maximum distance relative to one another, for preventing further displacement of the first and second displacement members relative to one another.

9. The pipe restraint of claim 7, wherein the first and second channels are located generally along the central axis of the restraining means.

10. A pipe restraint for permitting thermal expansion of a piping system, while inhibiting movement of the piping system during dynamic events and providing vibration isolation, the pipe restraint comprising:

(a) a first displacement member, said first displacement member including a first plate, (b) a second displacement member; and (c) restraining means including at least one helical coil for restraining displacement of the first and second displacement members relative to one another, the restraining means including:

(i) first and second portions, the first and second portions generally positioned on opposing sides of the central axis of the restraining means; and (ii) third and fourth portions, generally positioned on opposing sides of the central axis of the restraining means, wherein the first and second portions are connected to one of the displacement members, and the third and fourth portions are connected to the other displacement member, said helical coil being wound around said first plate.

11. The pipe restraint of claim 10, wherein the second displacement member includes a second plate, the second plate being oriented generally transverse to the first plate, and wherein the coil winds around both plates.

12. The pipe restraint of claim 11, wherein the helical coil includes first and second portions, the first portion being wound around the first and second plates with a first pitch, and the second portion being wound around the first and second plates with a second pitch.

13. The pipe restraint of claim 12, wherein the first and second pitches are substantially identical to one another, except for the direction of each pitch.

14. A pipe restraint for permitting thermal expansion of a piping system, while inhibiting movement of the piping system in a single direction during dynamic events and providing vibration isolation, the pipe restraint comprising:

(a) a first displacement member defining a first stop;

(b) a second displacement member defining a second stop, the first and second stops engaging one another when the first and second displacement members have displaced a predefined maximum distance relative to one another, for preventing further displacement of the first and second displacement members relative to one another; and (c) restraining means for restraining displacement of the first and second displacement members relative to one another, the restraining means including:

(i) first and second portions, the first and second portions generally positioned on opposing sides of the central axis of the restraining means; and (ii) third and fourth portions generally positioned on opposing sides of the central axis of the restraining means, wherein the first and second portions are connected to one of the displacement members, and the third and fourth portions are connected to the other displacement member.

15. The pipe restraint of claim 14, wherein the first and second stops are positioned to prevent further axial displacement as the displacement members move axially toward each other.

16. The pipe restraint of claim 14, wherein the first and second stops are positioned to prevent further axial displacement as the displacement members move axially away from each other.

17. The pipe restraint of claim 14, wherein the first displacement member defines a third stop and said second displacement member defines a fourth stop, the first and second stops cooperating to limit axial movement in a first direction, and the third and fourth stops cooperating to limit axial movement in a direction opposite to the first direction.

* * * * *